US009230371B2

(12) United States Patent
Jecks et al.

(10) Patent No.: US 9,230,371 B2
(45) Date of Patent: Jan. 5, 2016

(54) FUEL CONTROL DIAGNOSTIC SYSTEMS AND METHODS

(71) Applicant: GM Global Technology Operations LLC, Detroit, MI (US)

(72) Inventors: Daniel W. Jecks, Wixom, MI (US); Steven Ward Majors, Howell, MI (US); Ian J. MacEwen, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 14/099,009

(22) Filed: Dec. 6, 2013

(65) Prior Publication Data

US 2015/0081160 A1 Mar. 19, 2015

Related U.S. Application Data

(60) Provisional application No. 61/879,880, filed on Sep. 19, 2013.

(51) Int. Cl.
*B62D 11/00* (2006.01)
*F01N 3/00* (2006.01)
*G07C 5/00* (2006.01)
*F02D 41/00* (2006.01)

(52) U.S. Cl.
CPC . *G07C 5/00* (2013.01); *F02D 41/00* (2013.01)

(58) Field of Classification Search
CPC ...... G01M 15/05; F02D 41/22; F02D 41/266; F02D 2041/1409; F02D 2041/1415; F02D 2041/1416; F02D 2041/1418; F02D 2041/142; F02D 2041/1433; F02D 41/1402; F02D 41/1456; F02D 2041/1417; F02D 41/008; F02D 41/1441; F02D 2041/1426; G06F 11/2273
USPC ........... 701/42, 480, 510, 536, 105, 102, 103, 701/104; 60/285, 276, 277; 123/676, 677, 123/673, 679
See application file for complete search history.

(56) References Cited

U.S. PATENT DOCUMENTS

| | | | | |
|---|---|---|---|---|
| 4,364,227 | A | 12/1982 | Yoshida et al. | |
| 5,255,512 | A | 10/1993 | Hamburg et al. | |
| 5,272,872 | A | 12/1993 | Grutter et al. | |
| 5,602,737 | A | 2/1997 | Sindano et al. | |
| 6,446,429 | B2 | 9/2002 | Kobayashi et al. | |
| 6,453,665 | B1 | 9/2002 | Bower, Jr. et al. | |
| 6,594,987 | B2 | 7/2003 | Uranishi | |
| 6,996,974 | B2 | 2/2006 | Anilovich et al. | |
| 2004/0249556 | A1* | 12/2004 | Makki | F01N 11/005 701/114 |
| 2009/0225479 | A1* | 9/2009 | Jayanth et al. | G01R 19/10 361/30 |
| 2010/0146240 | A1* | 6/2010 | Hu | H04L 41/082 711/202 |
| 2011/0146240 | A1* | 6/2011 | Wilhelm et al. | 60/274 |
| 2014/0344508 | A1* | 11/2014 | Khan | G06F 9/5016 711/103 |

* cited by examiner

*Primary Examiner* — Muhammad Shafi

(57) ABSTRACT

A fault diagnostic system of a vehicle includes an error module, a proportional integral (PI) module, and a fault module. The error module determines an error based on a difference between a sample of a signal generated by an exhaust gas oxygen sensor and a target value of the sample. The PI module determines a proportional correction based on the error, determines an integral correction based on the error, and determines a fueling correction based on the proportional and integral corrections. The fault module selectively diagnoses a fault based on the integral correction and the fueling correction.

18 Claims, 6 Drawing Sheets

FUEL CONTROL DIAGNOSTIC SYSTEMS AND METHODS

CROSS-REFERENCE TO RELATED APPLICATIONS

This application claims the benefit of U.S. Provisional Application No. 61/879,880, filed on Sep. 19, 2013. The disclosure of the above application is incorporated herein by reference in its entirety.

FIELD

The present disclosure relates to internal combustion engines and more particularly to diagnostic systems and methods for fuel control systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system controls provision of fuel to an engine. The fuel control system includes an inner control loop and an outer control loop. The inner control loop may use data from an exhaust gas oxygen (EGO) sensor located upstream from a catalyst in an exhaust system. The catalyst receives exhaust gas output by the engine.

The inner control loop controls the amount of fuel provided to the engine based on the data from the upstream EGO sensor. For example only, when the upstream EGO sensor indicates that the exhaust gas is (fuel) rich, the inner control loop may decrease the amount of fuel provided to the engine. Conversely, the inner control loop may increase the amount of fuel provided to the engine when the exhaust gas is lean. Adjusting the amount of fuel provided to the engine based on the data from the upstream EGO sensor modulates the air/fuel mixture combusted within the engine at approximately a desired air/fuel mixture (e.g., a stoichiometry mixture).

The outer control loop may use data from an EGO sensor located downstream from the catalyst. For example only, the outer control loop may use the response of the upstream and downstream EGO sensors to determine an amount of oxygen stored by the catalyst and other suitable parameters. The outer control loop may also use the response of the downstream EGO sensor to correct the response of the upstream and/or downstream EGO sensors when the downstream EGO sensor provides an unexpected response.

SUMMARY

A fault diagnostic system of a vehicle includes an error module, a proportional integral (PI) module, and a fault module. The error module determines an error based on a difference between a sample of a signal generated by an exhaust gas oxygen sensor and a target value of the sample. The PI module determines a proportional correction based on the error, determines an integral correction based on the error, and determines a fueling correction based on the proportional and integral corrections. The fault module selectively diagnoses a fault based on the integral correction and the fueling correction.

In further features, an equivalence ratio (EQR) module controls fueling of an engine based on the fueling correction.

In still further features, the EQR module controls the fueling of the engine based on a sum of the fueling correction and a requested EQR.

In yet further features, the PI module limits the integral correction to a first predetermined maximum value and limits the proportional correction to a second predetermined maximum value, and the fault module selectively diagnoses the fault further based on the first and second predetermined maximum values.

In further features, a first averaging module determines a first average of values of the integral correction determined during a period. A second averaging module determines a second average of values of the fueling correction determined during the period. The fault module selectively diagnoses the fault based on the first and second average values and the first and second predetermined maximum values.

In still further features, a first normalizing module determines a first normalized value based on the first average and the first predetermined maximum value. A second normalizing module that determines a second normalized value based on the second average and the second predetermined maximum value. The fault module selectively diagnoses the fault based on the first and second normalized values.

In yet further features, the fault module indicates that the fault is present when at least one of: the first normalized value is greater than a first predetermined fault value; and the second normalized value is greater than a second predetermined fault value.

In further features, the fault module indicates that the fault is not present when at least one of: the first normalized value is less than a first predetermined fault value; and the second normalized value is less than a second predetermined fault value.

In still further features: the first normalizing module sets the first normalized value based on the first average divided by the first predetermined maximum value; and the second normalizing module sets the second normalized value based on the second average divided by the second predetermined maximum value.

In yet further features, the fault module illuminates a malfunction indicator lamp (MIL) when the fault is present.

A fault diagnostic method for a vehicle includes: determining an error based on a difference between a sample of a signal generated by an exhaust gas oxygen sensor and a target value of the sample; determining a proportional correction based on the error; determining an integral correction based on the error; determining a fueling correction based on the proportional and integral corrections; and selectively indicating that a fault is present based on the integral correction and the fueling correction.

In further features, the fault diagnostic method further includes controlling fueling of an engine based on the fueling correction.

In still further features, the fault diagnostic method further includes controlling the fueling of the engine based on a sum of the fueling correction and a requested equivalence ratio (EQR).

In yet further features, the fault diagnostic method further includes: limiting the integral correction to a first predetermined maximum value; limiting the proportional correction to a second predetermined maximum value; and selectively diagnosing the fault further based on the first and second predetermined maximum values.

In further features, the fault diagnostic method further includes: determining a first average of values of the integral correction determined during a period; determining a second average of values of the fueling correction determined during the period; and selectively diagnosing the fault based on the first and second average values and the first and second predetermined maximum values.

In still further features, the fault diagnostic method further includes: determining a first normalized value based on the first average and the first predetermined maximum value; determining a second normalized value based on the second average and the second predetermined maximum value; and selectively diagnosing the fault based on the first and second normalized values.

In yet further features, the fault diagnostic method further includes indicating that the fault is present when at least one of: the first normalized value is greater than a first predetermined fault value; and the second normalized value is greater than a second predetermined fault value.

In further features, the fault diagnostic method further includes indicating that the fault is not present when at least one of: the first normalized value is less than a first predetermined fault value; and the second normalized value is less than a second predetermined fault value.

In still further features, the fault diagnostic method further includes: setting the first normalized value based on the first average divided by the first predetermined maximum value; and setting the second normalized value based on the second average divided by the second predetermined maximum value.

In yet further features, the fault diagnostic method further includes illuminating a malfunction indicator lamp (MIL) when the fault is present.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel to produce torque. Exhaust gas oxygen (EGO) sensors measure amounts of oxygen in the exhaust upstream and downstream of a catalyst. EGO sensors may also be referred to as air/fuel sensors. Wide range air/fuel (WRAF) sensors and universal EGO (UEGO) sensors measure values between values indicative of rich and lean operation, while switching EGO and switching air/fuel sensors toggle between the values indicative of rich and lean operation.

An engine control module (ECM) controls fuel injection based on feedback from the EGO sensors. For example, the ECM determines a target for a measurement of the EGO sensor located downstream from the catalyst and determines a fueling correction based on a difference between the target and the measurement. The ECM adjusts fueling of the engine based on the fueling correction.

The ECM determines the fueling correction using a proportional integral (PI) control system. More specifically, the ECM determines a proportional correction and an integral correction based on the difference between the target and the measurement. The ECM determines the fueling correction based on the proportional and integral corrections. The ECM of the present disclosure selectively diagnoses a fault based on the integral correction and the fueling correction.

Figure 1:
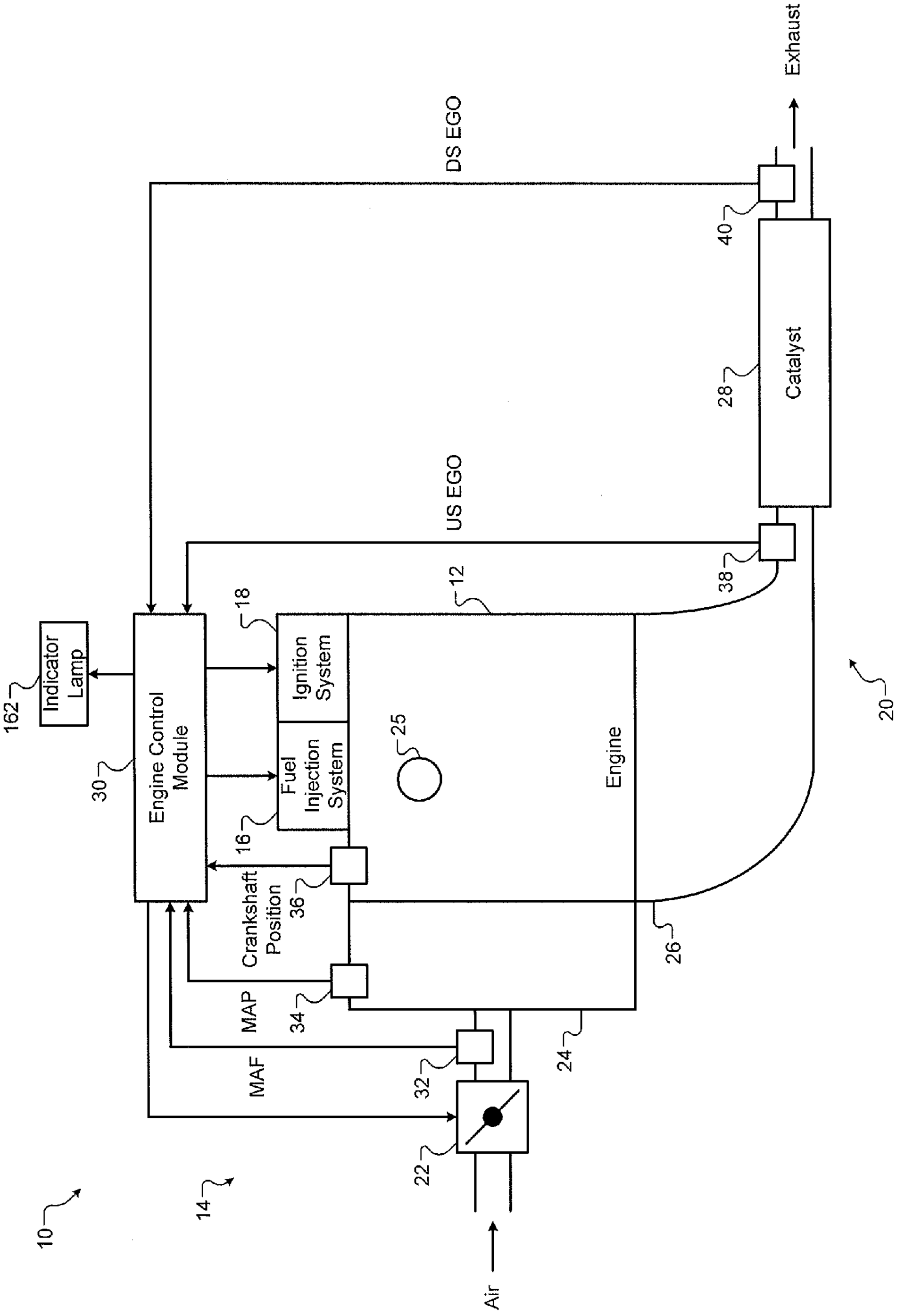
FIG. 1 is a functional block diagram of an example engine system according to the present disclosure.

Referring now to FIG. 1, a functional block diagram of an example engine system 10 is presented. The engine system 10 includes an engine 12, an intake system 14, a fuel injection system 16, an ignition system 18, and an exhaust system 20. While the engine system 10 is shown and will be described in terms of a gasoline engine, the present application is applicable to diesel engine systems, hybrid engine systems, and other suitable types of engine systems having a fuel vapor purge system.

The intake system 14 may include a throttle 22 and an intake manifold 24. The throttle 22 controls air flow into the intake manifold 24. Air flows from the intake manifold 24 into one or more cylinders within the engine 12, such as cylinder 25. While only the cylinder 25 is shown, the engine 12 may include more than one cylinder. The fuel injection system 16 includes a plurality of fuel injectors and controls (liquid) fuel injection for the engine 12.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three way catalyst (TWC) and/or another suitable type of catalyst. The catalyst 28 receives the exhaust output by the engine 12 and reacts with various components of the exhaust.

The engine system 10 also includes an engine control module (ECM) 30 that regulates operation of the engine system 10. The ECM 30 communicates with the intake system 14, the fuel injection system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other suitable sensors.

The MAF sensor 32 measures a mass flow rate of air flowing into the intake manifold 24 and generates a MAF signal based on the mass flow rate. The MAP sensor 34 measures pressure within the intake manifold 24 and generates a MAP signal based on the pressure. In some implementations, vacuum within the intake manifold 24 may be measured relative to ambient pressure.

The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). The crankshaft position signal may also be used for cylinder identification and one or more other suitable purposes.

The ECM 30 also communicates with exhaust gas oxygen (EGO) sensors associated with the exhaust system 20. For example only, the ECM 30 communicates with an upstream EGO sensor (US EGO sensor) 38 and a downstream EGO sensor (DS EGO sensor) 40. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure amounts of oxygen in the exhaust at their respective locations and generate EGO signals based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28.

The US and DS EGO sensors 38 and 40 may each include a switching EGO sensor, a universal EGO (UEGO) sensor (also referred to as a wide band or wide range EGO sensor), or another suitable type of EGO sensor. A switching EGO sensor generates an EGO signal in units of voltage. The generated EGO signal is between a low voltage (e.g., approximately 0.1 V) and a high voltage (e.g., approximately 0.8 V) when the oxygen concentration is lean and rich, respectively. A UEGO sensor generates an EGO signal that corresponds to an equivalence ratio (EQR) of the exhaust gas and provides measurements between rich and lean.

Figure 2:
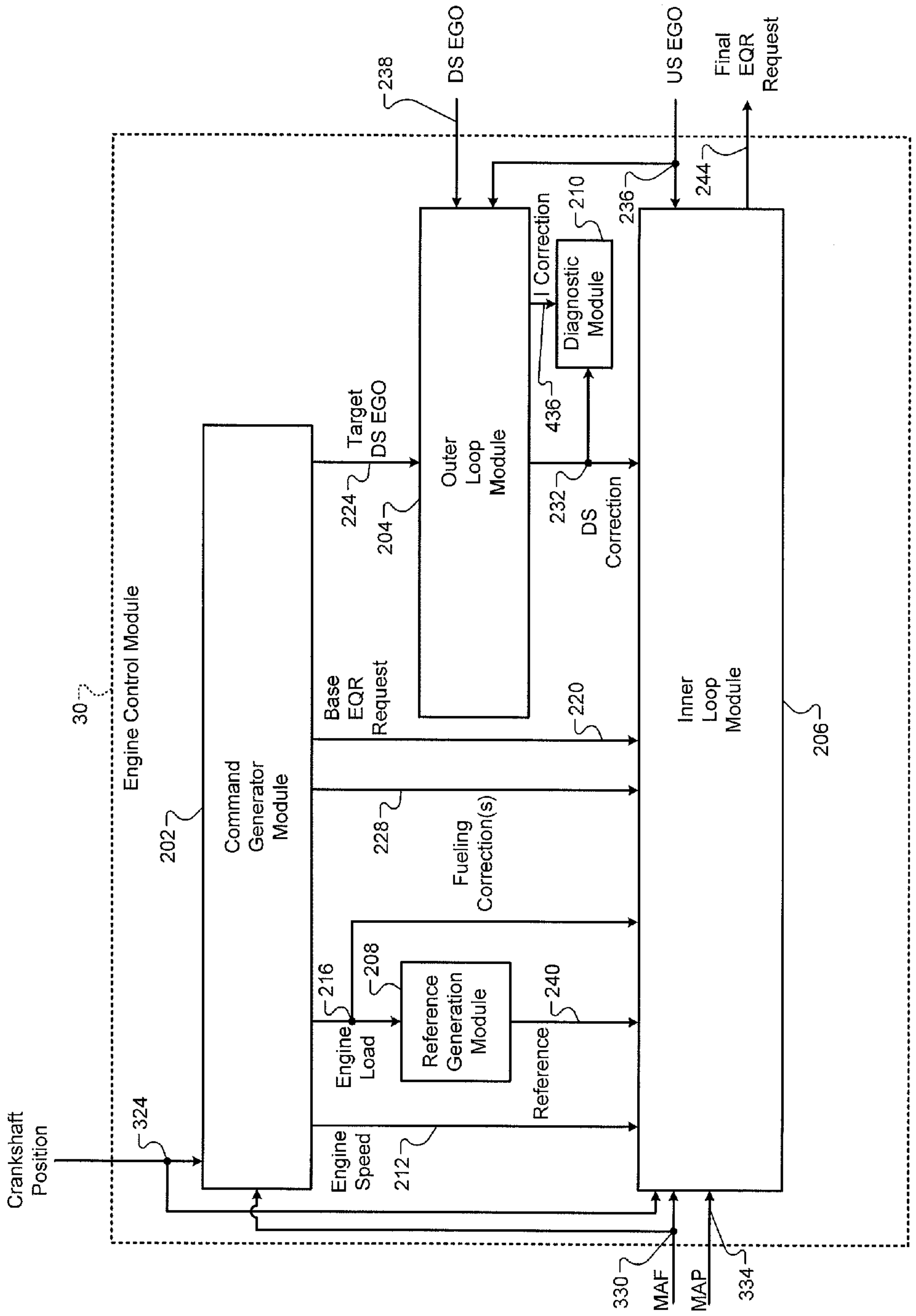
FIG. 2 is a functional block diagram of an example engine control module according to the present disclosure.

Referring now to FIG. 2, a functional block diagram of a portion of an example implementation of the ECM 30 is presented. The ECM 30 may include a command generator module 202, an outer loop module 204, an inner loop module 206, a reference generation module 208, and a diagnostic module 210.

The command generator module 202 may determine one or more engine operating conditions. For example only, the engine operating conditions may include, but are not limited to, engine speed 212, air per cylinder (APC), engine load 216, and/or other suitable parameters. The APC may be predicted for one or more future combustion events in some engine systems. The engine load 216 may be determined based on, for example, a ratio of the APC to a maximum APC of the engine 12. The engine load 216 may alternatively be determined based on an indicated mean effective pressure (IMEP), engine torque, or another suitable parameter indicative of engine load.

The command generator module 202 generates a base equivalence ratio (EQR) request 220. The base EQR request 220 may be generated, for example, based on an APC and to achieve a target equivalence ratio (EQR) of the air/fuel mixture. For example only, the target EQR may include a stoichiometric EQR (i.e., 1.0). An EQR may refer to a ratio of an air/fuel mixture to a stoichiometric air/fuel mixture. The command generator module 202 also determines a target downstream exhaust gas output (a target DS EGO) 224. The command generator module 202 may determine the target DS EGO 224 based on, for example, one or more of the engine operating conditions.

The command generator module 202 may also generate one or more open-loop fueling corrections 228 for the base EQR request 220. The open-loop fueling corrections 228 may include, for example, a sensor correction and an error correction. For example only, the sensor correction may correspond to a correction to the base EQR request 220 to accommodate the measurements of the US EGO sensor 38. The error correction may correspond to a correction in the base EQR request 220 to account for errors that may occur, such as errors in the determination of the APC and errors attributable to fuel vapor purging.

The outer loop module 204 (see also FIG. 4) also generates one or more open-loop fueling corrections for the base EQR request 220, such as downstream correction (DS correction) 232. The outer loop module 204 may generate, for example, an oxygen storage correction and an oxygen storage maintenance correction. For example only, the oxygen storage correction may correspond to a correction in the base EQR request 220 to adjust the oxygen storage of the catalyst 28 to a target oxygen storage within a predetermined period. The oxygen storage maintenance correction may correspond to a correction in the base EQR request 220 to modulate the oxygen storage of the catalyst 28 at approximately the target oxygen storage.

The outer loop module 204 may estimate the oxygen storage of the catalyst 28 based on the US EGO signal 236 (generated by the US EGO sensor 38) and the DS EGO signal 238 (generated by the DS EGO sensor 40). The outer loop module 204 may generate the open-loop fueling corrections to adjust the oxygen storage of the catalyst 28 to the target oxygen storage and/or to maintain the oxygen storage at approximately the target oxygen storage.

The outer loop module 204 generates the DS correction 232 to minimize a difference between the DS EGO signal 238 and the target DS EGO 224. Generation of the DS correction 232 is discussed further below in conjunction with the example of FIG. 4. The diagnostic module 210 (see also FIG. 5) selectively diagnoses the presence of a fault in the outer loop module 204.

The inner loop module 206 (see also FIG. 3) determines an upstream EGO error based on a difference between the US EGO signal 236 and an expected US EGO. The US EGO error may correspond to, for example, a correction in the base EQR request 220 to minimize the difference between the US EGO signal 236 and the expected US EGO. The inner loop module 206 normalizes the US EGO error to produce a normalized error and selectively adjusts the base EQR request 220 based on the normalized error.

The inner loop module 206 also determines an imbalance (fueling) correction for the cylinder 25. The inner loop module 206 determines an imbalance correction for each of the cylinders. The imbalance corrections may also be referred to as individual cylinder fuel correction (ICFCs) or fueling corrections. The imbalance correction for a cylinder may correspond to, for example, a correction in the base EQR request 220 to balance an output of the cylinder with output of the other cylinders.

The reference generation module 208 generates a reference signal 240. For example only, the reference signal 240 may include a sinusoidal wave, triangular wave, or another suitable type of periodic signal. The reference generation module 208 may selectively vary the amplitude and frequency of the reference signal 240. For example only, the reference generation module 208 may increase the frequency and amplitude as the engine load 216 increases and vice versa. The reference signal 240 may be provided to the inner loop module 206 and one or more other modules.

The reference signal 240 may be used in determining a final EQR request 244 to toggle the EQR of the exhaust gas provided to the catalyst 28 back and forth between a predetermined rich EQR and a predetermined lean EQR. For example only, the predetermined rich EQR may be approximately 3 percent rich (e.g., an EQR of 1.03), and the predetermined lean EQR may be approximately 3 percent lean (e.g., an EQR of approximately 0.97). Toggling the EQR may improve the efficiency of the catalyst 28. Additionally, toggling the EQR may be useful in diagnosing faults in the US EGO sensor 38, the catalyst 28, the DS EGO sensor 40, and/or one or more other components.

The inner loop module 206 determines the final EQR request 244 based on the base EQR request 220 and the normalized error. The inner loop module 206 determines the final EQR request 244 further based on the sensor correction, the error correction, the oxygen storage correction, and the oxygen storage maintenance correction, the reference signal 240, and the imbalance correction for the cylinder 25. The ECM 30 controls the fuel injection system 16 based on the final EQR request 244. For example only, the ECM 30 may control the fuel injection system 16 using pulse width modulation (PWM).

Figure 3:
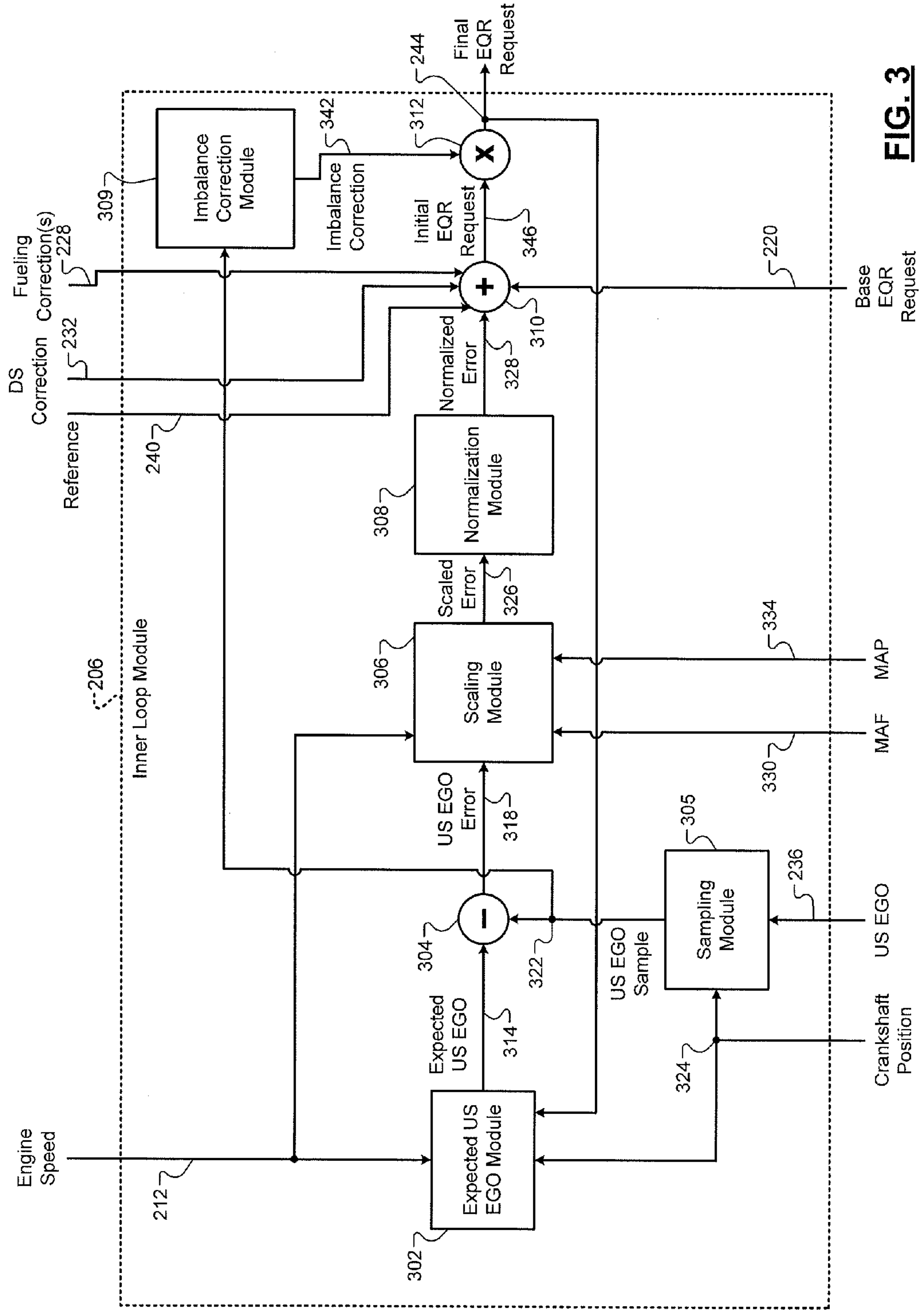
FIG. 3 is a functional block diagram of an example inner loop module according to the present disclosure.

Referring now to FIG. 3, a functional block diagram of an example implementation of the inner loop module 206 is presented. The inner loop module 206 may include an expected US EGO module 302, an error module 304, a sampling module 305, a scaling module 306, and a normalization module 308. The inner loop module 206 may also include an imbalance correction module 309, an initial EQR module 310, and a final EQR module 312.

The expected US EGO module 302 determines the expected US EGO 314. In implementations where the US EGO sensor 38 is a WRAF sensor or a UEGO sensor, the expected US EGO module 302 determines the expected US EGO 314 based on the final EQR request 244. The expected US EGO 314 corresponds to an expected value of a given sample of the US EGO signal 236. However, delays of the engine system 10 prevent the exhaust gas resulting from combustion from being immediately reflected in the US EGO signal 236. The delays of the engine system 10 may include, for example, an engine delay, a transport delay, and a sensor delay.

The engine delay may correspond to a period between, for example, when fuel is provided to a cylinder of the engine 12 and when the resulting exhaust is expelled from the cylinder. The transport delay may correspond to a period between when the resulting exhaust is expelled from the cylinder and when the resulting exhaust reaches the location of the US EGO sensor 38. The sensor delay may correspond to the delay between when the resulting exhaust reaches the location of the US EGO sensor 38 and when the resulting exhaust is reflected in the US EGO signal 236.

The US EGO signal 236 may also reflect a mixture of the exhaust produced by different cylinders of the engine 12. The expected US EGO module 302 accounts for exhaust mixing and the engine, transport, and sensor delays in determining the expected US EGO 314. The expected US EGO module 302 stores the EQR of the final EQR request 244. The expected US EGO module 302 determines the expected US EGO 314 based on one or more stored EQRs, exhaust mixing, and the engine, transport, and sensor delays.

The error module 304 determines an upstream EGO error (US EGO error) 318 based on a sample of the US EGO signal (a US EGO sample) 322 taken at a given sampling time and the expected US EGO 314 for the given sampling time. More specifically, the error module 304 determines the US EGO error 318 based on a difference between the US EGO sample 322 and the expected US EGO 314.

The sampling module 305 selectively samples the US EGO signal 236 and provides the samples to the error module 304. The sampling module 305 may sample the US EGO signal 236 at a predetermined rate, such as once per predetermined number of crankshaft angle degrees (CAD) as indicated by a crankshaft position 324 measured using the crankshaft position sensor 36. The predetermined rate may be set, for example, based on the number of cylinders of the engine 12, the number of EGO sensors implemented, the firing order of the cylinders, and a configuration of the engine 12. For example only, for a four cylinder engine with one cylinder bank and one EGO sensor, the predetermined rate may be approximately eight CAD based samples per engine cycle or another suitable rate.

The scaling module 306 determines a scaled error 326 based on the US EGO error 318. The scaling module 306 may apply one or more gains or other suitable control factors in determining the scaled error 326 based on the US EGO error 318. For example only, the scaling module 306 may determine the scaled error 326 using the equation:

$$\text{Scaled Error} = \text{MAF}/14.7 * \text{US EGO Error}, \qquad \text{Equation (1)}$$

where Scaled Error is the scaled error 326, MAF is a MAF 330 measured using the MAF sensor 32, and US EGO Error is the US EGO error 318. In various implementations, the scaling module 306 may determine the scaled error 326 using the relationship:

$$\text{Scaled Error} = k(\text{MAP, RPM}) * \text{US EGO Error}, \qquad \text{Equation (2)}$$

where RPM is the engine speed 212, MAP is a MAP 334 measured using the MAP sensor 34, k is a function of the MAP 334 and the engine speed 212, and US EGO Error is the US EGO error 318. In some implementations, k may be additionally or alternatively be a function of the engine load 216.

The normalization module 308 determines a normalized error 328 based on the scaled error 326. For example only, the normalization module 308 may include a proportional-integral (PI) controller, a proportional (P) controller, an integral (I) controller, or a proportional-integral-derivative (PID) controller that determines the normalized error 328 based on the scaled error 326.

In implementations involving a switching air/fuel sensor or a switching EGO sensor, the expected US EGO 314 may be set to the current commanded fueling state (i.e., the predetermined rich state or the predetermined lean state). The normalization module 308 determines the normalized error 328 based on a period that the US EGO signal 236 (or the samples) is different than the expected US EGO 314. In this manner, the normalized error 328 is determined based on the period that the US EGO sensor 38 indicates the previous commanded fueling state after a transition from the previous commanded fueling state to the current commanded fueling state.

The imbalance correction module 309 monitors the US EGO samples 322 of the US EGO signal 236. The imbalance correction module 309 determines imbalance values for the cylinders of the engine 12 based on the (present) US EGO sample 322 and an average of a predetermined number of previous US EGO samples 322.

The imbalance correction module 309 determines an offset value that relates (associates) one of the imbalance values to (with) one of the cylinders of the engine 12. The imbalance correction module 309 correlates the other cylinders of the engine with the other imbalance values, respectively, based on the firing order of the cylinders. The imbalance correction module 309 determines imbalance (fueling) corrections for the cylinders of the engine 12 based on the imbalance values associated with the cylinders, respectively. For example, the imbalance correction module 309 may determine an imbalance correction 342 for the cylinder 25 based on the imbalance value associated with the cylinder 25.

The initial EQR module 310 determines an initial EQR request 346 based on the base EQR request 220, the reference signal 240, the normalized error 328, the open-loop fueling correction(s) 228, and the DS correction 232. For example only, the initial EQR module 310 may determine the initial EQR request 346 based on the sum of the base EQR request 220, the reference signal 240, the normalized error 328, the open-loop fueling correction(s) 228, and the DS correction 232.

The final EQR module 312 determines the final EQR request 244 based on the initial EQR request 346 and the imbalance correction 342. More specifically, the final EQR module 312 corrects the initial EQR request 346 based on the imbalance correction 342 that is associated with the next cylinder in the firing order. The final EQR module 312 may, for example, set the final EQR request 244 equal to a product of the initial EQR request 346 and the imbalance correction 342 or to a sum of the initial EQR request 346 and the imbalance correction 342. The fuel injection system 16 controls fuel injection for the next cylinder in the firing order based on the final EQR request 244.

Figure 4:
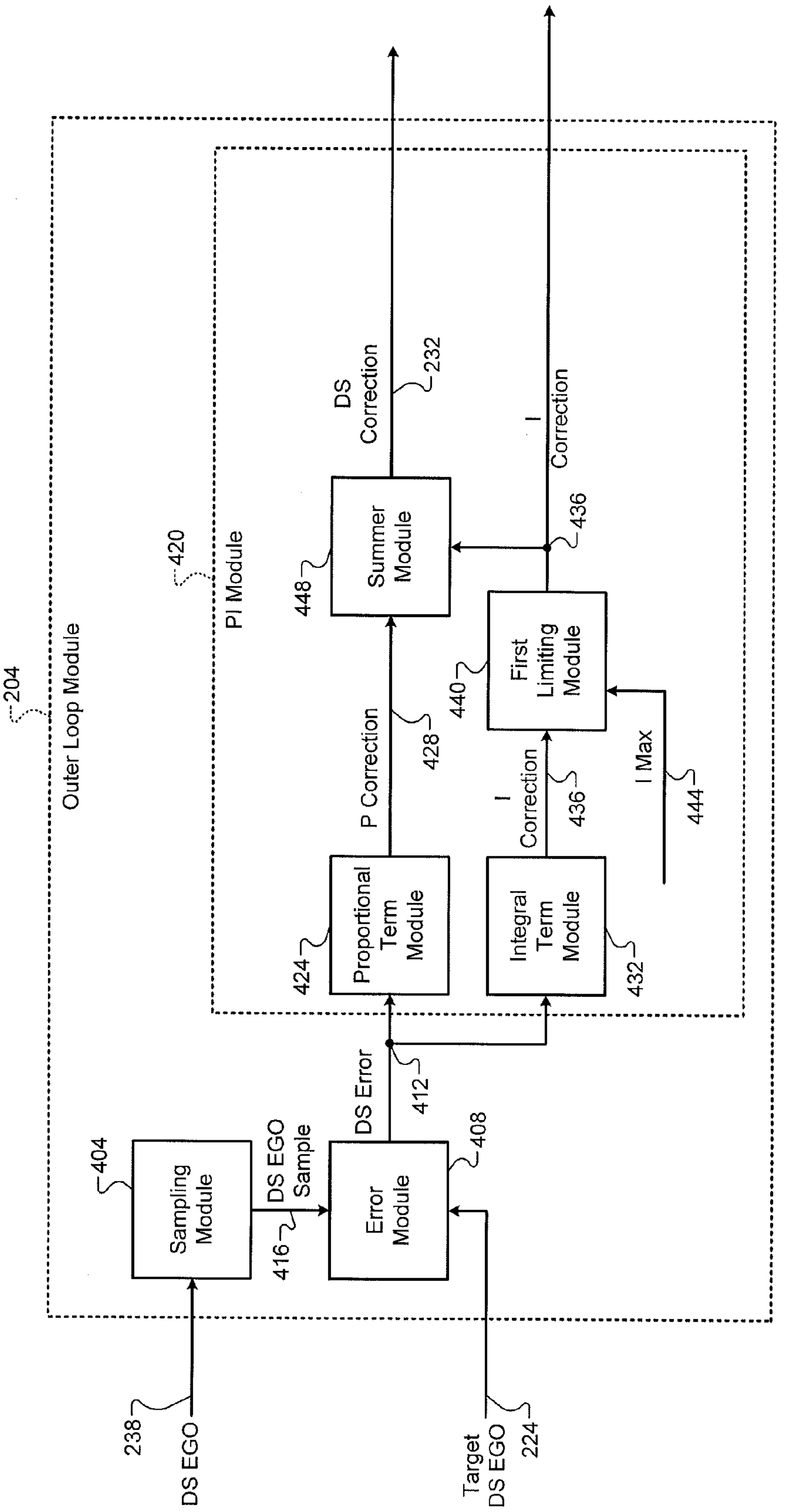
FIG. 4 is a functional block diagram of an example outer loop module according to the present disclosure.

Referring now to FIG. 4, a functional block diagram of an example implementation of the outer loop module 204 is presented. A sampling module 404 samples the DS EGO signal 238 at a predetermined rate. For example, the sampling module 404 may sample the DS EGO signal 238 once per predetermined number of CAD as indicated by the crankshaft position 324 or every predetermined period.

An error module 408 determines a downstream error (DS error) 412 based on a sample of the DS EGO signal (a DS EGO sample) 416 taken at a given sampling time and the target DS EGO 224 for the given sampling time. More specifically, the error module 408 determines the DS error 412 based on a difference between the DS EGO sample 416 and the target DS EGO 224. For example, the error module 408 may set the DS error 412 equal to or based on the DS EGO sample 416 minus the target DS EGO 224.

A proportional integral (PI) module 420 generates the DS correction 232 based on the DS error 412. More specifically, a proportional term module 424 determines a proportional correction 428 based on the DS error 412 and a proportional gain. For example, the proportional term module 424 may set the proportional correction 428 equal to or based on a product of the DS error 412 and the proportional gain, which may be represented as:

$$P=Kp*e(t),$$

where P is the proportional correction 428, Kp is the proportional gain, and e(t) is the DS error 412 at time t. The proportional term module 424 may also limit the proportional correction 428 to a predetermined maximum proportional correction (not shown). The predetermined maximum proportional correction corresponds to a maximum positive or negative value of the proportional correction 428. For example, when the magnitude of the proportional correction 428 is greater than the predetermined maximum proportional correction, the proportional module 424 retains the sign of the proportional correction 428 (positive or negative) and sets the proportional correction 428 to the predetermined maximum proportional correction. The predetermined maximum proportional correction may be set (calibrated) differently for different vehicles.

An integral term module 432 determines an integral correction 436 based on the DS error 412 and an integral gain. For example, the integral term module 432 may set the integral correction 436 equal to or based on a product of the DS error 412 and an integral of the DS error 412 over a predetermined period, which may be represented as:

$$I=Ki*\int_0^t e(\tau)*d\tau,$$

where I is the integral correction 436, Ki is the integral gain, and e is the DS error 412.

A first limiting module 440 limits the integral correction 436 to a predetermined maximum integral correction 444. The predetermined maximum integral correction 444 corresponds to a maximum positive or negative value of the integral correction 436. For example, when the magnitude of the integral correction 436 is greater than the predetermined maximum integral correction 444, the first limiting module 440 retains the sign of the integral correction 436 (positive or negative) and sets the integral correction 436 to the predetermined maximum integral correction 444. Examples of the predetermined maximum integral correction 444 for an example vehicle may be between approximately 400 and 1000 millivolts (mV) and other suitable values for a switching EGO sensor. The predetermined maximum integral correction 444 may be set (calibrated) differently for different vehicles.

A summer module 448 determines the DS correction 232 based on the proportional correction 428 and the integral correction 436. For example, the summer module 448 may set the DS correction 232 equal to or based on a sum of the proportional correction 428 and the integral correction 436.

The DS correction 232 is used to adjust the base EQR request 220 and determine the final EQR request 244, as discussed above. As discussed below, the DS correction 232 and the integral correction 436 are also used to diagnose the presence of a fault.

Figure 5:
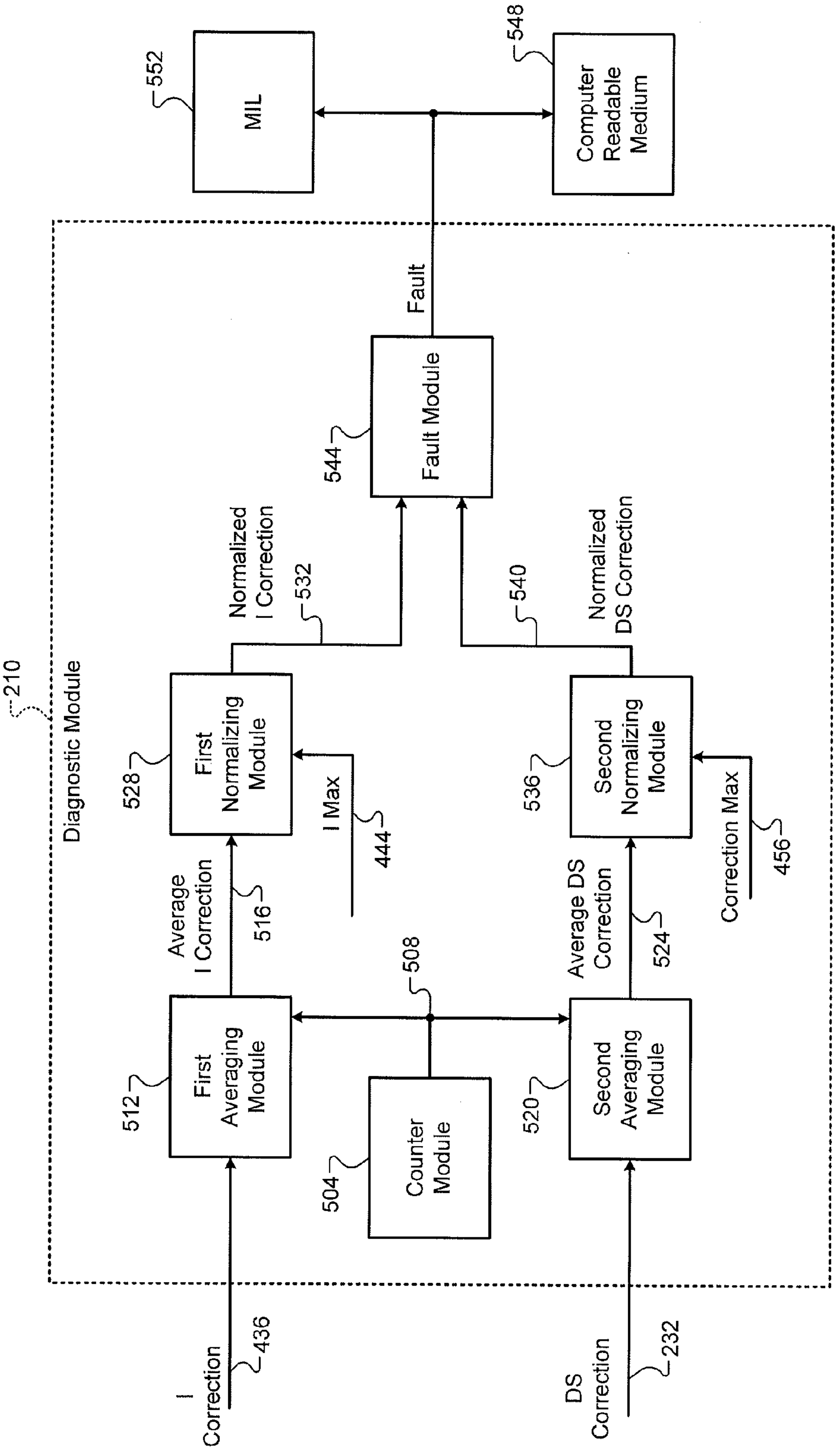
FIG. 5 is a functional block diagram of an example diagnostic module according to the present disclosure.

Referring now to FIG. 5, a functional block diagram of an example implementation of the diagnostic module 210 is presented. While the diagnostic module 210 is shown and discussed in conjunction with diagnosing a fault in the outer loop module 204 (e.g., in the PI module), the present disclosure is also applicable to diagnosing a fault in the inner loop module 206, for example, based on an integral correction and an upstream correction determined based on the US EGO error 318.

A counter module 504 increments a counter value 508 each time that the sampling module 404 samples the DS EGO signal 238. The counter value 508 therefore tracks the number of samples of the DS EGO signal 238 since the counter value 508 was last reset. The counter module 504 may reset the counter value 508, for example, each time that the counter value 508 becomes greater than a predetermined value. While a counter and a predetermined value are shown and discussed, a timer and a predetermined period may be used in various implementations.

A first averaging module 512 may reset an accumulated integral correction when the counter module 504 resets the counter value 508. When the counter value 508 is less than the predetermined value, the first averaging module 512 may add the integral correction 436 to the accumulated integral correction each time that the sampling module 404 samples the DS EGO signal 238. When the counter value 508 is greater than the predetermined value, the first averaging module 512 may determine an average integral correction 516 based on the accumulated integral correction. For example, the first averaging module 512 may set the average integral correction 516 equal to or based on the accumulated integral correction divided by the predetermined value. In other words, the first averaging module 512 may set the average integral correction 516 based on an average (i.e., mean) of the integral correction 436 values determined between when the counter value 508 is reset and when the counter value 508 becomes greater than the predetermined value.

A second averaging module 520 may reset an accumulated DS correction when the counter module 504 resets the counter value 508. When the counter value 508 is less than the predetermined value, the second averaging module 520 may add the DS correction 232 to the accumulated DS correction each time that the sampling module 404 samples the DS EGO signal 238. When the counter value 508 is greater than the predetermined value, the second averaging module 520 may determine an average DS correction 524 based on the accumulated DS correction. For example, the second averaging module 520 may set the average DS correction 524 equal to or based on the accumulated DS correction divided by the predetermined value. In other words, the second averaging module 520 may set the average DS correction 524 based on an average (i.e., mean) of the DS correction 232 values determined between when the counter value 508 is reset and when the counter value 508 becomes greater than the predetermined value.

A first normalizing module 528 generates a normalized integral correction 532 based on the average integral correction 516 and the predetermined maximum integral correction 444. For example, the first normalizing module 528 may set the normalized integral correction 532 based on or equal to the average integral correction 516 divided by the predetermined maximum integral correction 444. This normalizes the average integral correction 516 relative to the predetermined maximum integral correction 444.

A second normalizing module 536 generates a normalized DS correction 540 based on the average DS correction 524 and the predetermined maximum total correction 456. For example, the second normalizing module 536 may set the normalized DS correction 540 based on or equal to the average DS correction 524 divided by the predetermined maximum total correction 456. This normalizes the average DS correction 524 relative to the predetermined maximum total correction 456.

A fault module 544 diagnoses whether a fault is present based on the normalized integral correction 532 and/or the normalized DS correction 540. For example, the fault module 544 may indicate that no fault is present when both: the normalized integral correction 532 is less than a first predetermined fault value; and the normalized DS correction 540 is less than a second predetermined fault value. The fault module 544 may indicate that a fault is present when the normalized integral correction 532 is greater than the first predetermined fault value and/or the normalized DS correction 540 is greater than the second predetermined fault value. The first predetermined fault value is between zero and one-hundred percent of the predetermined maximum integral correction 444. The second predetermined fault value is between zero and one-hundred percent of the predetermined maximum total correction 456. The first and second predetermined fault values may be calibrated differently for different vehicles.

One or more remedial actions may be taken when a fault is present. For example, the fault module 544 may store a predetermined diagnostic trouble code (DTC) associated with the fault in a computer readable medium 548. Additionally or alternatively, the fault module 544 may illuminate a malfunction indicator lamp (MIL) 552, disable use of the DS correction 232, and/or take one or more remedial actions when a fault is present.

Figure 6:
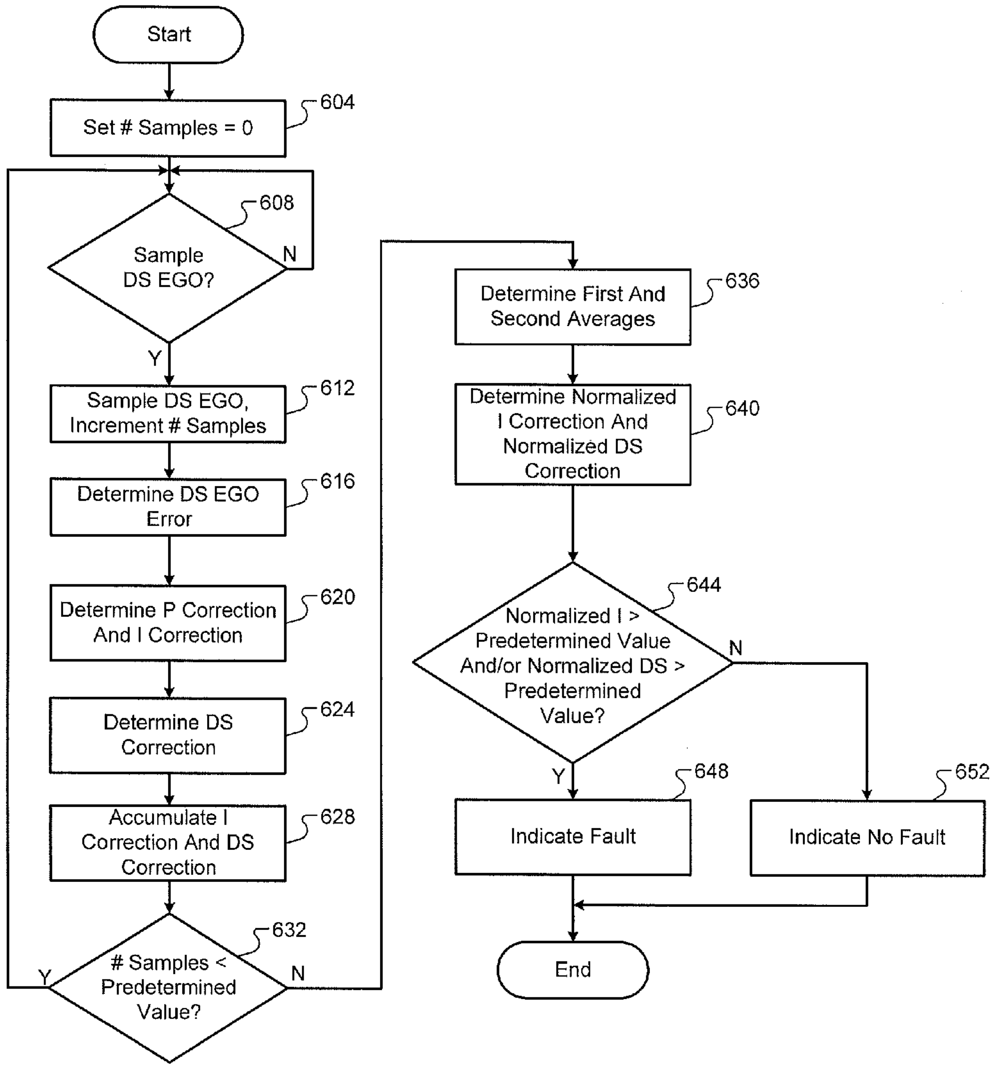
FIG. 6 is a flowchart depicting an example method of diagnosing a fault in a fuel control system according to the present disclosure.

Referring now to FIG. 6, a flowchart depicting an example method of diagnosing a fault in a fuel control system is presented. Control may begin with 604 where the counter module 504 resets the counter value 508 to zero. The first and second averaging modules 512 and 520 may also reset the accumulated integral correction and accumulated DS correction, respectively, to zero at 604. At 608, the sampling module 404 determines whether to sample the DS EGO signal 238. If 608 is true, control continues with 612. If 608 is false, control may remain at 608. For example, the sampling module 404 may sample the DS EGO signal 238 every predetermined period or every predetermined number of CAD.

At 612, the sampling module 404 samples the DS EGO signal 238, and the counter module 504 increments the counter value 508. The error module 408 determines the DS error 412 based on the DS EGO sample 416 (from 612) and the target DS EGO 224 at 616. For example, the error module 408 may set the DS error 412 equal to or based on the target DS EGO 224 minus the DS EGO sample 416.

At 620, the proportional term module 424 determines the proportional correction 428 based on the DS error 412 and the proportional gain. The integral term module 432 also determines the integral correction 436 based on the DS error 412 and the integral gain. The first limiting module 440 limits the integral correction 436 to the predetermined maximum integral correction 444.

The summer module 448 determines the DS correction 232 at 624 based on the proportional correction 428 and the integral correction 436. For example, the summer module 448 may set the DS correction 232 based on or equal to a sum of the proportional correction 428 and the integral correction 436. The second limiting module 452 limits the DS correction 232 to the predetermined maximum total correction 456. The inner loop module 206 determines the final EQR request 244 based on the DS correction 232, as discussed above.

At 628, the first averaging module 512 may add the integral correction 436 to the accumulated integral correction, and the second averaging module 520 may add the DS correction 232 to the accumulated DS correction. In this manner, the accumulated integral correction is equal to a sum of all of the integral correction 436 values determined since the accumulated integral correction was reset (at 604). Similarly, the accumulated DS correction is equal to a sum of all of the DS correction 232 values determined since the accumulated DS correction was reset (at 604).

The first and second averaging modules 512 and 520 determine whether the counter value 508 is less than the predetermined value at 632. If 632 is true, control may return to 608 to continue until the DS EGO signal 238 has been sampled the predetermined number of times. If 632 is false, control continues with 636. At 636, the first and second averaging modules 512 and 520 determine the average integral correction 516 and the average DS correction 524, respectively. For example, the first averaging module 512 may set the average integral correction 516 based on or equal to the accumulated integral correction divided by the predetermined value. The second averaging module 520 may set the average DS correction 524 based on or equal to the accumulated DS correction divided by the predetermined value.

At 640, the first normalizing module 528 determines the normalized integral correction 532 based on the average integral correction 516 and the predetermined maximum integral correction 444. The second normalizing module 536 also determines the normalized DS correction 540 based on the average DS correction 524 and the predetermined maximum total correction 456 at 640. For example, the first normalizing module 528 may set the normalized integral correction 532 based on or equal to the average integral correction 516 divided by the predetermined maximum integral correction 444. The second normalizing module 536 may set the normalized DS correction 540 based on or equal to the average DS correction 524 divided by the predetermined maximum total correction 456.

At 644, the fault module 544 determines whether the normalized integral correction 532 is greater than the first predetermined fault value and/or whether the normalized DS correction 540 is greater than the second predetermined fault value. If 644 is true, the fault module 544 may indicate that a fault is present at 648. If 644 is false, the fault module 544 may indicate that no fault is present at 652. One or more remedial actions may be taken when a fault is present. For example, the fault module 544 may store the predetermined DTC associated with the fault in the computer readable medium 548. Additionally or alternatively, the fault module 544 may illuminate the MIL 552, disable use of the DS correction 232, and/or take one or more remedial actions when a fault is present. While control is shown as ending after 648 or 652, the example of FIG. 6 may be illustrative of one control loop, and control may return to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A fault diagnostic system of a vehicle, comprising:

an error module configured to determine an error based on a difference between a sample of a signal generated by an exhaust gas oxygen sensor and a target value of the sample;

a proportional integral (PI) module configured to determine: (i) a proportional correction based on the error; and (ii) an integral correction based on the error, and further configured to determine a fueling correction based on the proportional and integral corrections; and a fault module configured to diagnose a fault based on the integral correction and the fueling correction and to illuminate a malfunction indicator lamp (MIL) when the fault is diagnosed.

2. The fault diagnostic system of claim 1 further comprising an equivalence ratio (EQR) module configured to control fueling of an engine based on the fueling correction.

3. The fault diagnostic system of claim 2 wherein the EQR module is configured to control the fueling of the engine based on a sum of the fueling correction and a requested EQR.

4. The fault diagnostic system of claim 1 wherein:

the PI module is further configured to limit the integral correction to a first predetermined maximum value and is further configured to limit the proportional correction to a second predetermined maximum value; and the fault module is configured to diagnose the fault further based on the first and second predetermined maximum values.

5. The fault diagnostic system of claim 4 further comprising:

a first averaging module configured to determine a first average of values of the integral correction determined during a period; and a second averaging module configured to determine a second average of values of the fueling correction determined during the period, wherein the fault module is configured to diagnose the fault based on the first and second average values and the first and second predetermined maximum values.

6. The fault diagnostic system of claim 5 further comprising:

a first normalizing module configured to determine a first normalized value based on the first average and the first predetermined maximum value; and a second normalizing module configured to determine a second normalized value based on the second average and the second predetermined maximum value, wherein the fault module is configured to diagnose the fault based on the first and second normalized values.

7. The fault diagnostic system of claim 6 wherein the fault module is configured to indicate that the fault is present when at least one of:

the first normalized value is greater than a first predetermined fault value; and the second normalized value is greater than a second predetermined fault value.

8. The fault diagnostic system of claim 6 wherein the fault module is configured to indicate that the fault is not present when at least one of:

the first normalized value is less than a first predetermined fault value; and the second normalized value is less than a second predetermined fault value.

9. The fault diagnostic system of claim 6 wherein:

the first normalizing module is configured to set the first normalized value based on the first average divided by the first predetermined maximum value; and the second normalizing module is configured to set the second normalized value based on the second average divided by the second predetermined maximum value.

10. A fault diagnostic method for a vehicle, comprising:

generating, using an exhaust gas oxygen sensor, a signal based on oxygen in exhaust output by an engine;

determining, using an engine control module (ECM), an error based on a difference between a sample of the signal generated by the exhaust gas oxygen sensor and a target value of the sample;

determining, using the ECM, a proportional correction based on the error;

determining, using the ECM, an integral correction based on the error;

determining, using the ECM, a fueling correction based on the proportional and integral corrections;

using the ECM, indicating that a fault is present based on the integral correction and the fueling correction; and using the ECM, illuminating a malfunction indicator lamp (MIL) when the fault is present.

11. The fault diagnostic method of claim 10 further comprising controlling fueling of the engine based on the fueling correction.

12. The fault diagnostic method of claim 11 further comprising controlling the fueling of the engine based on a sum of the fueling correction and a requested equivalence ratio (EQR).

13. The fault diagnostic method of claim 10 further comprising:

limiting the integral correction to a first predetermined maximum value;

limiting the proportional correction to a second predetermined maximum value; and diagnosing the fault further based on the first and second predetermined maximum values.

14. The fault diagnostic method of claim 13 further comprising:

determining a first average of values of the integral correction determined during a period;

determining a second average of values of the fueling correction determined during the period; and diagnosing the fault based on the first and second average values and the first and second predetermined maximum values.

15. The fault diagnostic method of claim 14 further comprising:

determining a first normalized value based on the first average and the first predetermined maximum value;

determining a second normalized value based on the second average and the second predetermined maximum value; and diagnosing the fault based on the first and second normalized values.

16. The fault diagnostic method of claim 15 further comprising indicating that the fault is present when at least one of:

the first normalized value is greater than a first predetermined fault value; and the second normalized value is greater than a second predetermined fault value.

17. The fault diagnostic method of claim 15 further comprising indicating that the fault is not present when at least one of:

the first normalized value is less than a first predetermined fault value; and the second normalized value is less than a second predetermined fault value.

18. The fault diagnostic method of claim 15 further comprising:

setting the first normalized value based on the first average divided by the first predetermined maximum value; and setting the second normalized value based on the second average divided by the second predetermined maximum value.

* * * * *